C. GUILMART.
SPRING WHEEL.
APPLICATION FILED JUNE 22, 1915.
1,220,329.
Patented Mar. 27, 1917.
2 SHEETS—SHEET 1.
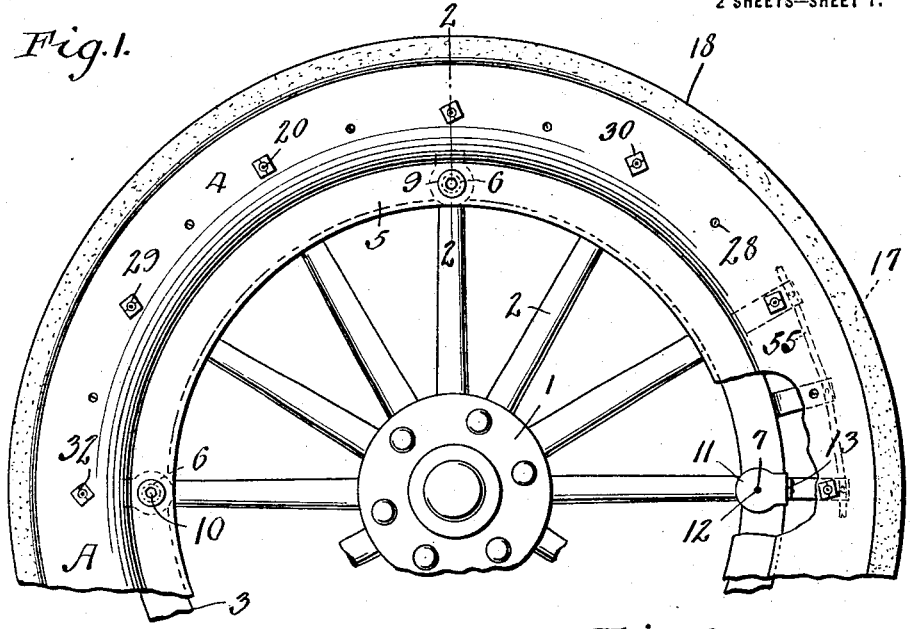
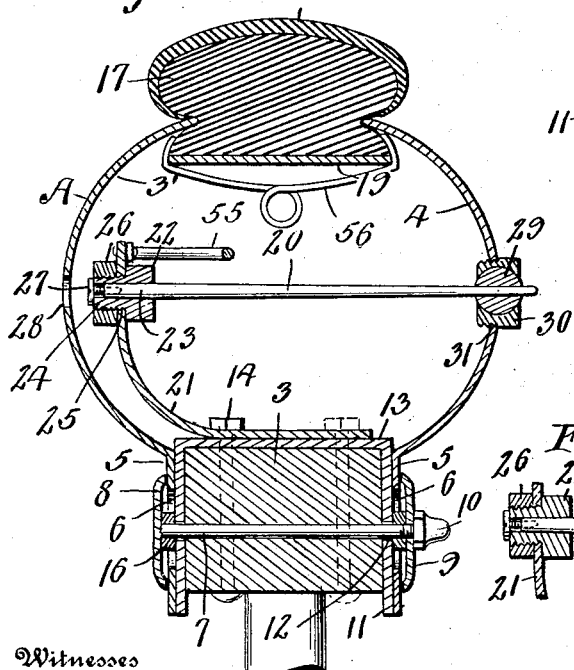
Inventor
C. Guilmart,
By Victor J. Evans
Attorney C. GUILMART.
SPRING WHEEL.
APPLICATION FILED JUNE 22, 1915.
1,220,329.
Patented Mar. 27, 1917.
2 SHEETS—SHEET 2.
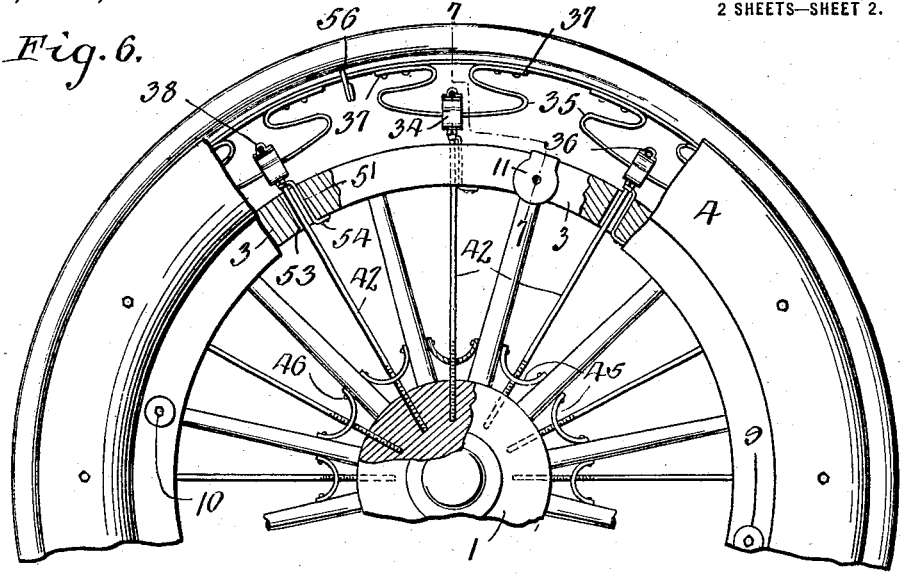
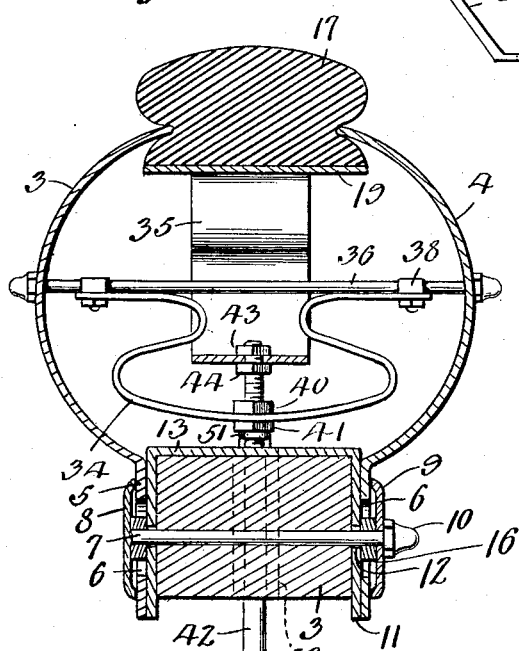
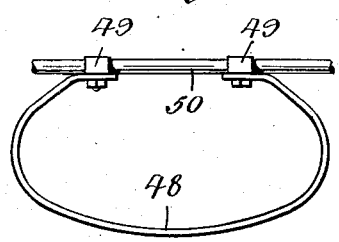
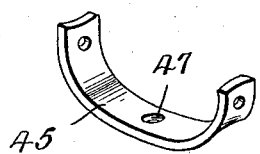
Witnesses
Inventor
C. Guilmart,
By Victor J. Evans
Attorney

UNITED STATES PATENT OFFICE.

CELESTIN GUILMART, OF GOSHEN, CONNECTICUT.

SPRING-WHEEL.

1,220,329.  Specification of Letters Patent.  Patented Mar. 27, 1917.

Application filed June 22, 1915. Serial No. 35,597.

*To all whom it may concern:*

Be it known that I, CELESTIN GUILMART, a citizen of the United States, residing at Goshen, in the county of Litchfield and State of Connecticut, have invented new and useful Improvements in Spring-Wheels, of which the following is a specification.

This invention relates to spring wheels, the object in view being to produce a wheel by means of which the ordinary inflated pneumatic tire is dispensed with and yet the necessary resiliency retained for the purpose of absorbing all ordinary road shocks, the construction, as hereinafter fully described, providing in connection with a wheel felly and solid resilient tire, a resilient tire carrying rim of novel construction combined with rim-sustaining means of a flexible nature, the invention also embodying in one form thereof tire supporting springs which are used in supplemental relation to the rim sustaining means, the resilient rim being of such construction as to inclose and house in the rim and tire supporting means.

With the above and other objects in view, the invention consists in the novel construction, combination and arrangement of parts, as herein described, illustrated and claimed.

In the accompanying drawings:—

Figure 1 is a fragmentary side elevation partly broken away illustrating the resilient wheel of this invention.

Fig. 2 is an enlarged cross section through the felly of the wheel and also through the rim, tire, and adjacent parts.

Fig. 3 is a detail perspective view of one of the wear clips.

Fig. 4 is a similar view of one of the ball and socket members.

Fig. 5 is a fragmentary section on the same line as Fig. 2 showing another form of flexible sustaining rod.

Fig. 6 is a fragmentary side elevation partly in section illustrating the arrangement of the supplemental tire supporting springs.

Fig. 7 is an enlarged cross section through the same.

Fig. 8 is a detail perspective view of one of the angle braces.

Fig. 9 is a detail view showing another form of rim sustaining spring and a portion of one of the rim sustaining rods.

Fig. 10 is a detail edge view of one of the spring braces.

Referring to the drawings 1 designates the hub of the wheel, 2 the spokes thereof and 3 the felly.

Extending around the felly is a flexible or spring rim designated generally by A and comprising twin sections 3 and 4 each of which is approximately semi-circular in cross section, the flexible rim A, as a whole, being thus divided into twin sections. Each section 3 and 4 has at its inner portion an annular flange 5 and these flanges 5 are located at opposite sides of the felly 3 as illustrated for example in Fig. 2. The flanges 5 are provided at any desired number of intervals with openings 6 extending therethrough and preferably circular in formation as shown in Fig. 1. Bolts 7 extend through the flanges 5 and also transversely through the felly 3, each of said bolts being provided with a relatively large head 8 at one end and a correspondingly shaped washer 9 at the other end together with a clamping nut 10 which bears against the washer 9.

Wear clips corresponding in number with the bolts 7, are used, one of which is illustrated in detail in Fig. 3 and its applied relation to the felly and rim being shown in Fig. 2. Each of said clips comprises the disk-shaped side members 11 formed with holes 12 to receive the bolt 7 and a connecting plate like portion 13 which fits against the outer periphery of the felly as shown in Fig. 2, being secured thereto by bolts 14 inserted through holes 15 in the wear clip and also through corresponding holes in the felly. The distance between the disk-shaped members 11 is such that they fit closely against the opposite sides of the felly 3, the latter being ordinarily of wood. Spacing washers 16 are inserted between the portions 11 of the wear clip and the head 8 and washer 9 of the bolt 7 so that while the flanges 5 are thus held snugly against the disk-shaped members 11 said flanges are free to slide in any direction while in contact with the wear clips thus preventing any wear from coming on the wooden felly 3. The openings 6 in the flanges 5 are of sufficient size to allow the flexible rim to slide in relation to the felly in any direction except transversely of the felly.

Between the outer edges of the rim sections 3 and 4 a tire 17 is clamped, said tire being preferably of solid rubber or some composition containing rubber in order to provide for the necessary resiliency. An extra tough reinforcing tread 18 is applied around the projecting portion of the tire 17 which is substantially elliptical in cross section and a tire supporting hoop or band 19 of metal extends around the inner surface of the tire 17. A circular series of flexible rim sustaining rods 20 extend transversely of the felly and rim, each of said rods being supported at one end by a spring arm 21 which is bolted to the felly 3 as shown and which is formed in its free end with an opening to receive a step 22 for one end of the adjacent rod 20, the latter being terminally tapered as shown at 23 where it fits into the step 22. The step 22 is provided with a threaded extension 24 which is inserted through the opening 25 in the spring arm 21 where it receives a clamping nut 26. 27 designates a binding screw which is threaded into the adjacent end of the rod 20 to lock said rod in the step 22, access being obtained to the screw 27 through an opening 28 in the adjacent section of the rim A immediately opposite the end of the rod 20. At its opposite end each rod 20 passes slidingly through the ball member 29 of a ball and socket joint, 30 designating the socket member of the joint which is threaded through an opening 31 in the adjacent section of the rim A thus admitting of a relative rocking movement between the rod 20 and the rim and also a relative sliding movement between said parts as clearly indicated in Fig. 2. As shown in Fig. 4, the socket member 30 is diametrically split or divided at 32 to allow the same to be placed around the ball 29 before screwing the same into the opening 31.

In lieu of the straight and tapering flexible rim sustaining rod 20 shown in Fig. 2, said rod may be coiled between its ends as shown at 33 in Fig. 5 thus giving increased resiliency or flexibility to each sustaining rod, a feature that is particularly desirable in light cars or vehicles not ordinarily subjected to heavy loads.

Referring now to Figs. 6 and 7, it will be seen that in addition to the rod sustaining spring arms 34, tire sustaining springs 35 are employed in supplemental relation to the spring arms 34, the latter supporting the flexible rim sustaining rods 36 while the springs 35 directly support the tire 17 by bearing against the inner face of the hoop or band 19 to which the extremities of the springs 35 are attached at 37. The main body of each spring arm 34 is substantially elliptical in shape with the terminal portions thereof extended outwardly away from each other where they are secured by clips 38 to one of the rods 36. Under the arrangement shown in Fig. 7 both ends of the rod 36 are inserted through holes in the sections 3 and 4 of the rim. Each of the spring arms 34 is adjustably fastened by means of nuts 40 and 41 at opposite sides thereof, said nuts being threaded upon radially extending flexible rods or supplemental spokes 42 fastened at their inner ends to the hub 1 as shown in Fig. 6. In like manner each of the springs 35 is secured to the adjacent rod or spoke 42 adjustably by means of nuts 43 and 44 at opposite sides of the spring. Angle or corner braces 45 substantially U-shaped, are secured to the adjacent faces of adjoining spokes at 46 and provided with threaded holes 47 through which the rods or auxiliary spokes 42 are inserted. Instead of forming the spring arms 34 as shown in Fig. 7, they may be formed as shown in Fig. 9 in which it will be seen that the member 48 comprises two spring arms corresponding with the spring arms 34 of Fig. 7 or the spring arm 21 of Fig. 2, the member 48 being substantially elliptical with inturned extremities or arms fastened by clips 49 to the adjacent rim sustaining rod 50.

From the foregoing description, taken in connection with the accompanying drawings, it will now be understood that the rim A which is formed of hard rolled sheet steel, practically incloses and renders dirt proof the space in which the rim sustaining and tire supporting springs are contained. The rim is itself resiliently supported in relation to the felly of the wheel and the tire is resiliently supported by supplemental means in relation to the felly of the wheel. Furthermore, the outer portion of the wheel including the rim and tire and the supporting means therefor is movable both radially and longitudinally in relation to the felly of the wheel thus providing for the necessary resiliency of the wheel as a whole to compensate for and absorb ordinary road shocks. Where the structure hereinabove described is used upon the driving wheel of an automobile or motor truck, it may be found desirable to use traction straps 51 as shown in Fig. 6, said straps passing through openings 53 through which the rods or auxiliary spokes 42 pass and being connected at one end to the felly as shown at 54 and at the other end to the adjacent spoke or rod 42. The openings 53 in the felly will be of sufficient extent longitudinally of the felly to admit of the necessary movement of the spokes or rods 42 relatively to the felly 3. This prevents excessive longitudinal or creeping movement of the tire in relation to the felly.

The spring arms 21 are connected together in series by means of obliquely extending braces 55 as indicated in Figs. 1 and 2, one end of each brace 55 being connected to one of the spring arms 21 while the opposite end thereof is connected to the adjoining spring on the opposite side and so on throughout the length of the tire. Spring clips 56 are employed as shown in Fig. 2 to fasten the band 19 and tire 17 together. Any desired number of such clips may be employed throughout the length of the tire.

What I claim is:—

1. In a spring wheel, the combination with a wheel felly, of a flexible sheet steel tubular rim divided longitudinally into approximately semi-cylindrical twin sections, means connecting the sections of said tubular rim to the felly to admit of the bodily movement of the rim in relation to the felly, a resilient tire held between the outer edges of the rim sections, flexible rim sustaining rods having a positive connection with said rim, and rod sustaining spring arms fastened to and extending transversely of the felly.

2. In a spring wheel, the combination with a wheel felly, of a flexible sheet steel tubular rim divided longitudinally into approximately semicylindrical twin sections, means connecting the sections of said tubular rim to the felly to admit of the bodily movement of the rim in relation to the felly, a resilient tire held between the outer edges of the rim sections, rim-sustaining rods, spring arms supporting said rods, and tire supporting springs operating in supplemental relation to the rim-sustaining rods and spring arms.

In testimony whereof I affix my signature in presence of two witnesses.

CELESTIN GUILMART.

Witnesses:
Louise T. Smith,
Elliott B. Bronson.

Copies of this patent may be obtained for five cents each, by addressing the "Commissioner of Patents, Washington, D. C."